United States Patent
Dillon

[15] 3,665,539
[45] May 30, 1972

[54] AUTOMATIC SHACKLE WASHER

[72] Inventor: Janus J. Dillon, Irving, Tex.

[73] Assignee: Food Equipment, Inc., Dallas, Tex.

[22] Filed: Apr. 9, 1970

[21] Appl. No.: 26,892

[52] U.S. Cl. .....................................15/21 D, 15/88, 17/24
[51] Int. Cl. .....................................................A46b 13/02
[58] Field of Search ...................15/21 R, 21 D, 21 E, 77, 88, 15/97, 198, 200, 21; 17/11.1, 24, 44; 198/229

[56] References Cited

UNITED STATES PATENTS

| | | | |
|---|---|---|---|
| 2,329,555 | 9/1943 | Polk, Sr. | 15/3.17 UX |
| 1,111,752 | 9/1914 | Lichtenstein et al. | 198/229 |
| 3,284,828 | 11/1966 | Jennings et al. | 15/21 D |
| 3,526,012 | 9/1970 | Cirino | 15/21 D |
| 3,535,733 | 10/1970 | Hamaj et al. | 17/24 |

*Primary Examiner*—Edward L. Roberts
*Attorney*—Richards, Harris & Hubbard

[57] ABSTRACT

Shackles are transported by an overhead conveyor through a housing. A pair of motor rotated brushes are mounted on opposite sides of the housing along the path of travel of the shackles. The brushes comprise a plurality of flexible fibers extending from a center axis. When at rest, the flexible fibers of the brushes tend to droop downwardly to form a clearance between the brushes so that the shackles may travel unimpeded between the brushes. When the brushes are rotated, the flexible fibers extend outwardly into contact with the shackles for cleaning thereof. Structure is provided to direct fluid upon the brushes and the shackles during operation of the system.

6 Claims, 3 Drawing Figures

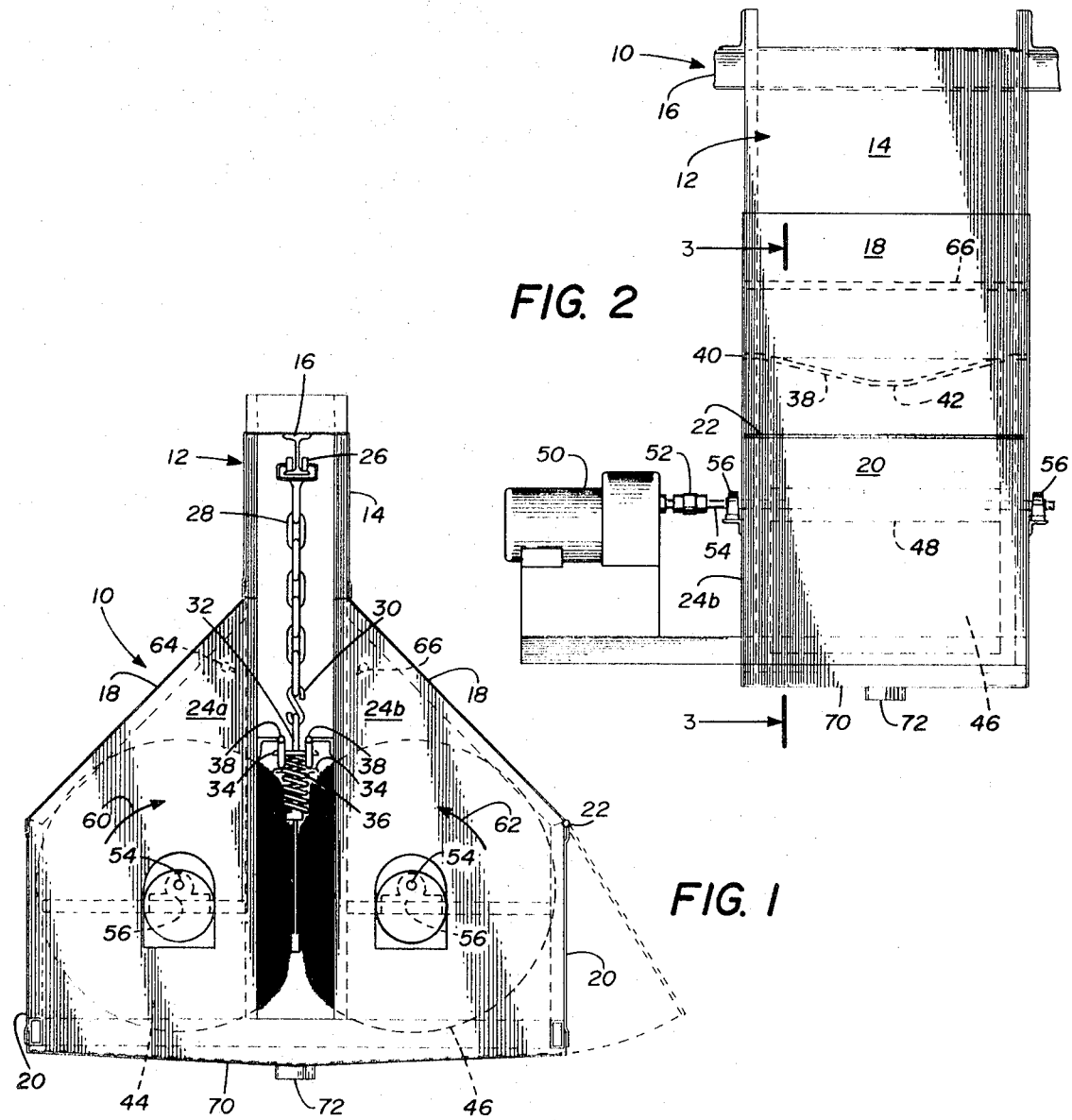
FIG. 2
FIG. 1
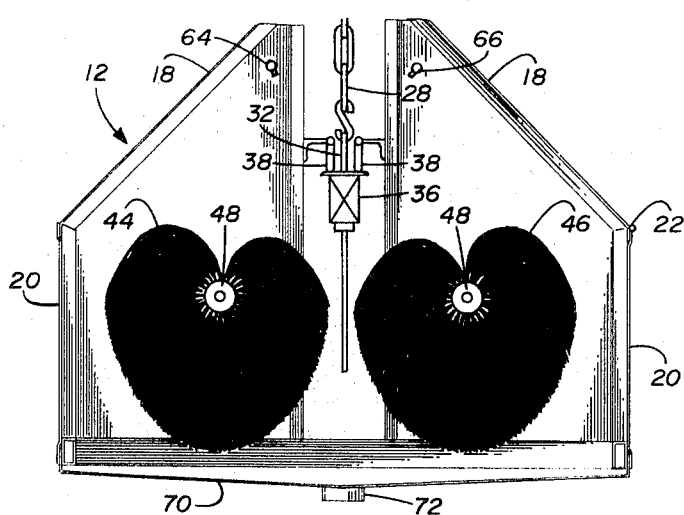
FIG. 3
INVENTOR:
JANUS J. DILLON
Richards, Harris & Hubbard
ATTORNEY

AUTOMATIC SHACKLE WASHER

FIELD OF THE INVENTION

This invention relates to cleaning techniques, and more particularly an apparatus wherein rotating brushes are utilized to clean shackles used for animal processing.

THE PRIOR ART

Overhead conveyors are commonly used in animal processing plants to transport a plurality of shackles along a processing path. Animal carcasses are hung from the shackles and are then transported through a series of processing stations. For example, in fowl processing plants, fowl are hung by the feet from shackles and are transported through a killing station, a scalding or steam spray station and on to a feather picking station. The defeathered fowl are then removed from the shackles and the shackles are transported back to receive other fowl.

Such shackles during normal usage become covered with blood, feathers, fats and other deposits as a result of such processing steps. Additionally, the residue and contaminants collected by the shackles often tend to build up as permanent stains and coatings due to the exposure to scalding water and steam and then subsequently drying out. It is thus desirable to periodically clean such shackles for sanitation purposes and also to prevent clogging of the moving parts of the conveyor and of the shackles.

SUMMARY OF THE INVENTION

In accordance with one aspect of the invention, a pair of spaced apart brushes are disposed on opposite sides of a shackle conveying line. A motor rotates the brushes such that the periphery of the brushes contacts shackles traveling along the conveying line. Spray nozzles direct fluid upon the brushes and shackles to assist in the cleaning thereof.

In accordance with another aspect of the invention, a housing is provided for installation in an existing shackle line such that an overhead conveyor transports shackles through the housing. A pair of brushes are mounted on opposite sides of the housing and comprise a plurality of flexible members extending from the center axis. The flexible members tend to droop downwardly when stationary to form a clearance between the brushes so that the shackles can travel unimpeded therebetween. A motor is provided to rotate the brushes such that the flexible members extend outwardly into contact with the shackles for cleaning thereof. Structure may also be provided to trip certain types of shackles into an open position while traveling through the housing to facilitate cleaning of the shackle trip mechanism.

DESCRIPTION OF THE DRAWINGS

For a more complete understanding of the present invention and for further objects and advantages thereof, reference is now made to the following description taken in conjunction with the accompanying drawings, in which:

FIG. 1 illustrates an end view of the present shackle cleaning system during rotation of the cleaning brushes;

FIG. 2 illustrates a side view of the housing shown in FIG. 1; and

FIG. 3 illustrates a sectional view of the housing taken generally along section lines 3—3 in FIG. 2 with the brushes therein being at rest.

DESCRIPTION OF THE PREFERRED EMBODIMENT

Referring to FIG. 1, the shackle cleaning system of the invention is designated generally by the numeral 10 and comprises a housing 12 constructed from galvanized or stainless steel sheet metal. The housing 12 includes an elongated upper portion 14 which accommodates an overhead conveyor 16. Panels 18 extend outwardly and downwardly from the upper portion 14 and join with sidewalls 20 to complete the housing. As shown in FIG. 1, one of the sidewalls 20 is pivoted at a pivot hinge 22 and is adapted to be opened for easy access and cleaning of the housing 12.

The front of the housing 12 is enclosed by panels 24a–b, with the rear of the housing being enclosed by similar panels. A vertical slot opening extends from the upper portion 14 and between the panels 24a–b to allow the passage of shackles depending from the overhead conveyor 16 through the housing. Each shackle includes a pair of rollers 26 from which is suspended a chain 28. Chain 28 and the rollers 26 are propelled along the overhead conveyor by suitable chain towing structure. A clamp 30 supports the shackle 32 in the conventional manner from the chain 28. In the illustrated embodiment, the shackle 32 comprises a conventional automatic shackle which may be positioned in either closed or open positions. Such shackles are commercially available and essentially comprise a member 34 biased against a spring 36.

In the position of the member 34 illustrated as 34', the shackle is in the closed position. A pair of tripper rods 38 are connected along the sides of the housing 12. As best shown in FIG. 2, each of the rods begins at an elevated position 40 and slopes downwardly to a maximum depressed portion 42, after which the rods slope upwardly. As the shackles enter the housing 14, member 34 abuts with the underside of the rods 38 and is depressed downwardly as the shackle travels through the housing until the shackle is forced to its open position. The purpose for opening the shackles within the housing 12 is to better expose the tripping mechanism of the shackle for cleaning purposes. Upon further travel of the shackle through the housing 12, the upward curve of the rods 38 allow the shackle to return to the closed position 34'.

A pair of brushes 44 and 46 are disposed on opposite sides of the housing 12 on opposite sides of the travel path of the shackles. FIG. 3 illustrates the configuration of the brushes 44 and 46 in their stationary position. Each of the brushes comprises a cylindrical center member 48 from which depend a large number of flexible brush fibers. In the preferred embodiment, the fibers comprise flexible plastic strands joined by one end to the cylindrical member 48. Due to the flexible nature of the fibers, they tend to droop downwardly when the brushes 44 and 46 are at rest. Therefore, as shown in FIG. 3, a space exists between the brushes 44 and 46 when at rest for unimpeded passage of the shackle 32. The present shackle washer may thus be installed in an existing shackle line and will not interfere with the normal operation of the shackle line when cleaning is not desired.

FIG. 2 illustrates a gear motor 50 which is operable to rotate the brushes 44 and 46. Output shaft 52 extends from the motor 50 and rotates the brushes 44 and 46. If desired, a single motor 50 may be utilized with suitable gearing to drive both brushes, but in other embodiments, two different motors may be utilized to drive the brushes. An axle 54 passes through each of the cylindrical members 48 and are rotatably supported by bearing supports 56 on the housing 12.

As best shown in FIG. 1, operation of the motor 50 causes rotation of the brushes 44 and 46. The rotation of the brushes causes the flexible members of the brushes to become outwardly extending due to centrifugal force. The edges of the flexible members thus contact and brush against the sides of the shackle 32 to effect cleaning thereof. In the preferred embodiment, the brushes 44 and 46 are rotated in opposite directions as illustrated by the arrows 60 and 62. The edge portion of the flexible fibers of the brushes 44 and 46 move downwardly against the sides of the shackle 32 to prevent whipping of the chain 28 during operation of the cleaning system. The contact of the brushes 44 and 46 against the sides of the shackles tends to remove debris and accumulated contaminants therefrom.

Fluid is applied to the rotating brushes from conduits 64 and 66 connected in the upper portion of the housing 12. The conduits comprise pipe members affixed to the housing with a plurality of spray nozzles spaced along the length thereof. The conduits are connected to a low pressure source of fluid, such as a city water supply, and the nozzles spray streams of water upon the rotating brushes. The fluid wets the brushes and tends to make them heavier for a better cleaning effect during operation. Additionally, the fluid tends to rinse debris from the brushes. Debris falls to the housing bottom 70 which is slanted downwardly on both sides toward the middle. A drain 72 is connected to the bottom 70 to eliminate waste from the system.

The present system is particularly adapted for use with a high pressure water spray system such as the system disclosed in applicant's copending U.S. Pat. application Ser. No. 26,920, filed Apr. 9, 1970. In the preferred embodiment, when both the high pressure water spray system and the present brush system are installed in a conventional shackle line, the high pressure water spray system is turned on for one cycle of cold water washing to remove the blood and most of the feathers from the shackles after the last fowl is hung therefrom. After the first cycle, warm water, with or without detergent added, is applied to the moving shackles and the present brush washer is started. The starting may be done manually, or by suitable microswitch controls.

The brushes 44 and 46 begin rotating and remove or loosen the stains and contaminants immediately before the shackles enter the high pressure spray enclosure. As the shackles move through the housing 12, the tripper rods 38 trip the shackles open to allow the brushes to remove any feathers or debris that are wedged in the tripper mechanism. After passage through the rotating brushes of the invention, the shackles are then conveyed through the high pressure spray where it is sprayed with warm water for final removal of the debris. After the shackles are transported through a suitable number of cycles through the cleaning system, the present rotating brush system is turned off, and the brushes 44 and 46 fall to the position shown in FIG. 3 to allow unimpeded passage of the shackles during normal operation.

Whereas the present invention has been described with respect to a specific embodiment thereof, it will be understood that various changes and modifications will be suggested to one skilled in the art, and it is intended to encompass such changes and modifications as fall within the scope of the appended claims.

What is claimed is:

1. A system for cleaning automatic shackles capable of being opened or closed comprising:
   a pair of spaced apart brushes for being disposed on opposite sides of a shackle conveying line,
   means for rotating said brushes such that the brushes contact shackles traveling along said conveying line,
   means for directing fluid upon said brushes and shackles, and
   means for tripping said shackles to an opened position while said shackles are traveling past said brushes.
2. The system of claim 1 wherein said brushes comprise:
   a cylindrical center member, and
   a plurality of flexible fibers extending from said center member, said flexible fibers tending to hang downwardly when at rest to define an opening for the passage of said shackles and said flexible fibers tending to extend outwardly from said center member upon rotation for contacting said shackles.
3. A cleaning system for shackles adapted to be moved between open and closed positions comprising:
   a housing through which an overhead conveyor transports shackles,
   a pair of brushes mounted on opposite sides of said housing, said brushes comprising a plurality of flexible members extending from a center axis, said flexible members tending to droop downwardly when stationary to form a clearance between said brushes for unimpeded travel of said shackles therethrough,
   means for rotating said brushes such that said flexible members extend outwardly into contact with said shackles for cleaning thereof, and
   means for tripping said shackles to an opened position while traveling through said housing.
4. The shackle cleaning system of claim 3 wherein said means for tripping comprises:
   elongated bars extending along said housing and including downwardly extending bend portions.
5. The shackle cleaning system of claim 3 and further comprising:
   means for directing fluid upon said brushes during rotation thereof.
6. A shackle cleaning system comprising:
   a housing through which an overhead conveyor transports shackles depending from chain means,
   a pair of brushes mounted within said housing on opposite sides of the line of travel of said shackles, said brushes mounted for rotation about a generally horizontal axis and comprising a plurality of flexible members extending from a center axis, said flexible members tending to droop downwardly when stationary to form a clearance between said brushes for unimpeded travel of shackles therethrough,
   means for selectively rotating said brushes in opposite directions to one another such that said flexible members extend outwardly and are moved downwardly against said shackles for cleaning thereof, and
   elongated conduits disposed within said housing on opposite sides of the path of travel of said shackles and connected to a source of fluid, said conduits including a plurality of apertures disposed therealong for spraying fluid downwardly upon said rotating brushes to facilitate the cleaning action of said brushes.

* * * * *